(12) United States Patent
Paden et al.

(10) Patent No.: US 9,395,012 B2
(45) Date of Patent: Jul. 19, 2016

(54) ELECTROMAGNETIC VALVE APPARATUS WITH NONLINEAR SPRING

(71) Applicant: LAUNCHPOINT TECHNOLOGIES, INC., Goleta, CA (US)

(72) Inventors: Brian A. Paden, Santa Barbara, CA (US); Orlo James Fiske, Goleta, CA (US); Michael R. Ricci, Camarillo, CA (US); Murat Okcuoglu, Santa Barbara, CA (US); David B. Paden, Goleta, CA (US); Bradley E. Paden, Santa Barbara, CA (US)

(73) Assignee: LAUNCHPOINT TECHNOLOGIES, INC., Goleta, CA (US)

( * ) Notice: Subject to any disclaimer, the term of this patent is extended or adjusted under 35 U.S.C. 154(b) by 0 days.

(21) Appl. No.: 14/556,814

(22) Filed: Dec. 1, 2014

(65) Prior Publication Data

US 2015/0108381 A1    Apr. 23, 2015

Related U.S. Application Data

(63) Continuation of application No. PCT/US2013/022080, filed on Jan. 18, 2013.

(60) Provisional application No. 61/661,244, filed on Jun. 18, 2012.

(51) Int. Cl.
| | |
|---|---|
| *F16K 31/04* | (2006.01) |
| *F01L 1/04* | (2006.01) |
| *F01L 9/04* | (2006.01) |
| *F01L 1/46* | (2006.01) |
| *F16K 31/56* | (2006.01) |
| *F16K 1/12* | (2006.01) |

(52) U.S. Cl.
CPC . *F16K 31/04* (2013.01); *F01L 1/04* (2013.01); *F01L 1/462* (2013.01); *F01L 9/04* (2013.01);

(Continued)

(58) Field of Classification Search
CPC .......... F16K 31/04; F16K 1/12; F16K 31/56; F16K 31/563; F16K 31/566; F01L 1/462; F01L 1/04; F01L 9/04; F01L 2101/00; F01L 2009/0467; F01L 2009/0407; F01L 2009/0411; F01L 2009/0403; F01L 2009/0432; F15B 13/0446
USPC ............................... 251/75, 129.2, 337, 905; 251/129.11–129.13
See application file for complete search history.

(56) References Cited

U.S. PATENT DOCUMENTS

| 1,523,759 A * | 1/1925 | Dougherty, Jr. ..... F16K 31/0679 251/75 |
| 2,579,723 A * | 12/1951 | Best ...................... H01F 7/1615 251/129.1 |

(Continued)

FOREIGN PATENT DOCUMENTS

| JP | 9203476 | 8/1997 |
| RU | 2239115 | 10/2004 |
| SU | 1551928 | 3/1990 |

OTHER PUBLICATIONS

International Searching Authority, International Search Report from International Application No. PCT/US2013/022080, Apr. 18, 2013, Moscow, Russia.

*Primary Examiner* — John Bastianelli
(74) *Attorney, Agent, or Firm* — Dennis R. Haszko

(57) ABSTRACT

An electromagnetic valve apparatus with nonlinear springs for variable valve timing in an internal combustion engine. The apparatus includes a valve, floating spring assembly, translational cam, and motor. The cam and spring serve to minimize lash and valve stem bending forces. During opening and closing of the valve, spring potential energy is converted into valve kinetic energy and then back into potential energy at the end of the motion. The potential energy is then available for the next opening/closing event. The motor initiates motion, replaces friction and vibration losses, and terminates motion. However, the motor supplies minimal energy as the valve opens and closes, and vice-versa, naturally due to combined effects of system inertia and the nonlinear spring. In addition to valve control, the apparatus may be applied to fuel injectors, or any reciprocating linear or rotary mechanism where electronic control is used.

21 Claims, 14 Drawing Sheets

(52) U.S. Cl.
CPC . *F16K 1/12* (2013.01); *F16K 31/56* (2013.01); *F16K 31/563* (2013.01); *F01L 2009/0403* (2013.01); *F01L 2009/0407* (2013.01); *F01L 2009/0411* (2013.01); *F01L 2009/0432* (2013.01); *F01L 2009/0467* (2013.01); *F01L 2101/00* (2013.01)

(56) References Cited

U.S. PATENT DOCUMENTS

| | | | | |
|---|---|---|---|---|
| 4,635,683 A | * | 1/1987 | Nielsen | H01F 7/13 251/129.15 |
| 5,189,991 A | * | 3/1993 | Humburg | F16K 31/0675 251/129.1 |
| 6,257,182 B1 | | 7/2001 | Hara et al. | |
| 6,299,130 B1 | * | 10/2001 | Yew | F02M 25/0772 251/129.15 |
| 6,742,761 B2 | * | 6/2004 | Johnson | F16K 31/566 251/75 |
| 6,819,208 B1 | * | 11/2004 | Peghaire | F01L 9/04 251/129.01 |
| 6,837,478 B1 | * | 1/2005 | Goossens | B60T 8/363 251/129.15 |
| 6,948,461 B1 | * | 9/2005 | Kotwicki | F01L 9/04 251/129.07 |
| 2004/0046137 A1 | * | 3/2004 | Herbert | F16K 31/0672 251/129.04 |

* cited by examiner

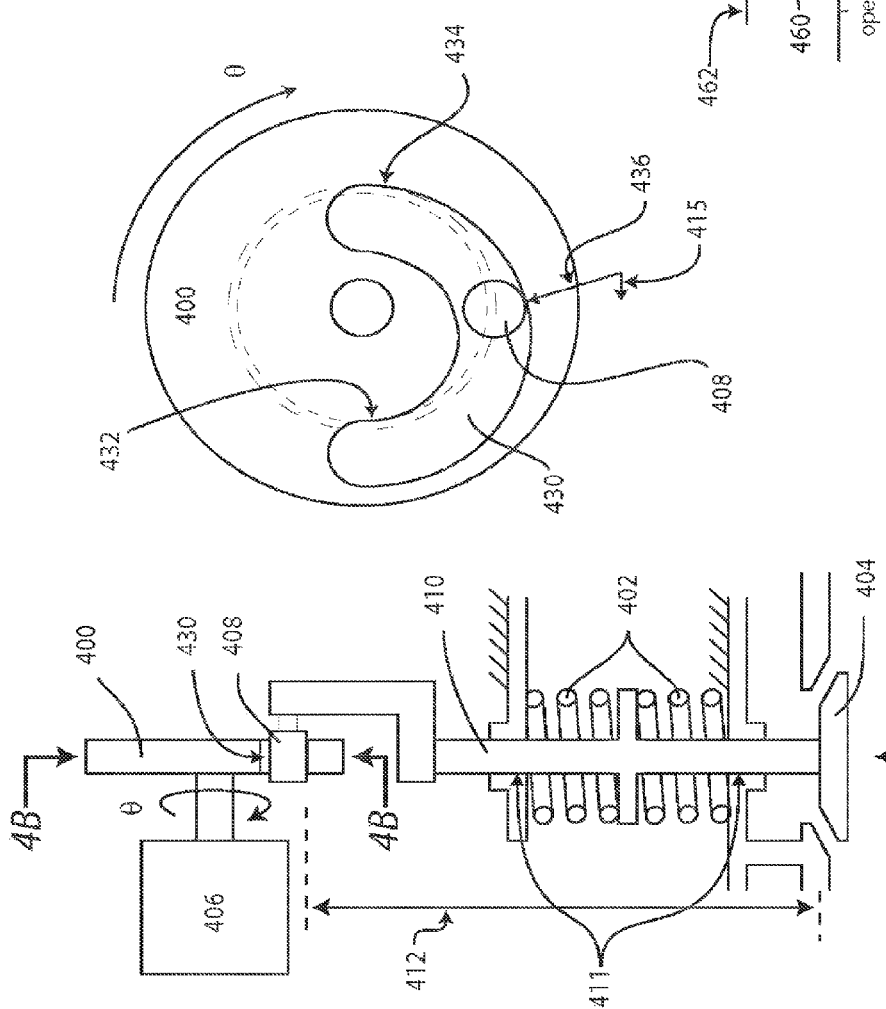

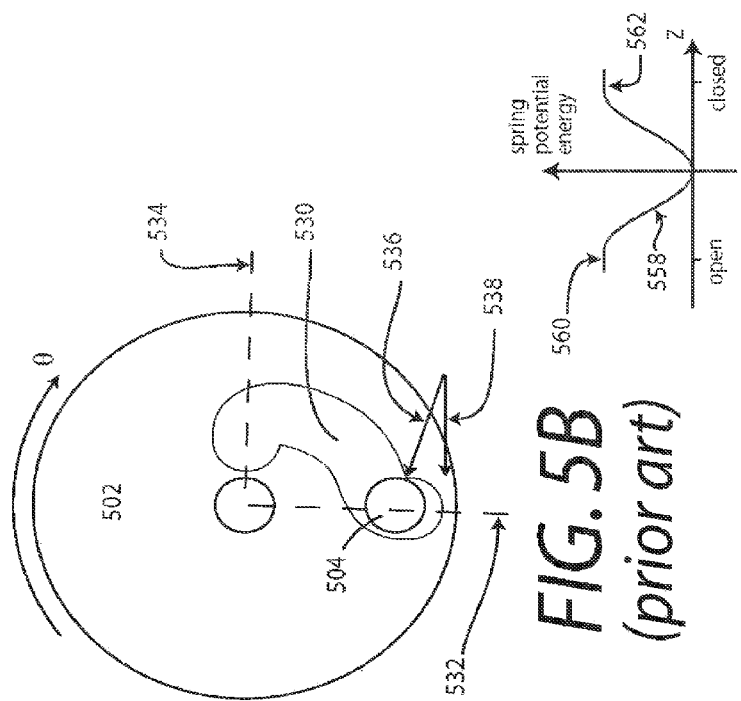
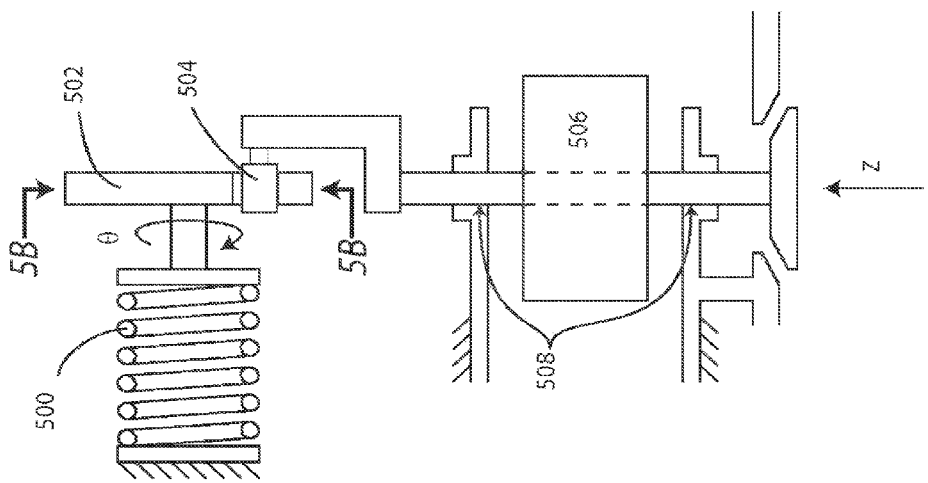
FIG. 5A (prior art)
FIG. 5B (prior art)
FIG. 5C

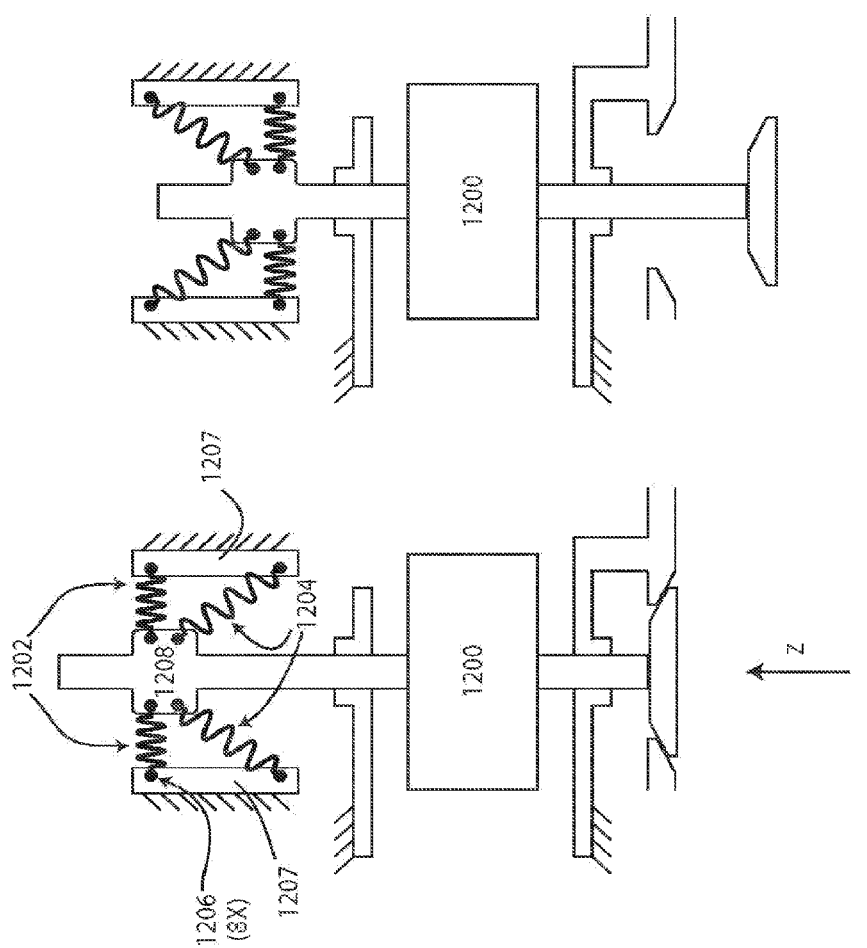

ELECTROMAGNETIC VALVE APPARATUS WITH NONLINEAR SPRING

CROSS-REFERENCE TO RELATED APPLICATIONS

This application is a continuation of Application No. PCT/US13/22080 filed on 18 Jan. 2013 which claims priority from U.S. Provisional Application No. 61/661,244 filed on 18 Jun. 2012.

STATEMENT REGARDING FEDERALLY SPONSORED RESEARCH OR DEVELOPMENT

This invention was made with U.S. Government support under grants IIP-0945595 and IIP-1058556 awarded by the National Science Foundation. The U.S. Government has certain rights in the invention.

FIELD OF THE INVENTION

The present invention relates generally to an apparatus for electronic engine valve operation. More particularly, the present invention relates to electromagnetic valve assemblies with nonlinear springs and involving electronically controlled linear actuators for driving valves.

BACKGROUND OF THE INVENTION

There are various types of linear electric motors and electromagnetic actuators that can move an object along a limited length linear path and are controlled electronically. These actuators utilize electric energy and convert it into kinetic energy of a moving object when accelerating the object from a stationary position. They also compensate for any motion-related losses and decelerate the object to a stop at the end of travel while dissipating the kinetic energy of the object or converting it partially back to some other form of energy.

Utilization of such electric and electromagnetic actuators for driving of intake and exhaust poppet valves of an internal combustion engine is one of the many applications of these actuator mechanisms. Many such known actuators are designed for controlling the opening and closing of engine valves for implementation of variable valve timing (VVT) and variable valve lift (VVL). This significant attention to VVT and VVL is explained by corresponding performance improvements of a conventional internal combustion engines in terms of improved fuel efficiency and reduced emissions when VVT and VVL are used.

One embodiment of an electronically controlled linear actuator for a valve mechanism involves direct utilization of a linear electric motor for opening or closing the valve during the engine operation. Due to a very short interval of time allowed for the opening and closing events, on the order of few milliseconds, the electric motor that can open or close a conventional engine valve in the required amount of time would be too big and inefficient for practical implementation in the engine. This inefficiency arises mainly due to ohmic losses in the motor coils. In addition, if the motor is required to counter a spring force, there are likewise ohmic losses in countering the spring force in addition to the inertial forces for accelerating the valve.

With reference to FIG. 1, there is shown a prior art electronic valve system with the valve 100 oriented roughly in a half-open position. The valve controls the flow of gas through manifold 102 as part of, for example, an internal combustion engine. The net force of the springs 104 and 106 is roughly zero in this configuration. Computer-controlled electromagnets 108 and 110 act on the armature 112 to form a simple linear motor that works in conjunction with the springs 104 and 106 on the valve stem 114 to cause valve transitions. Valve closure is accomplished when the valve 100 is brought into contact with the valve seat 116. The upper spring 104 is constrained by a stationary retainer 118 and the lower spring 106 is constrained by the stationary cylinder head 120. Hash marks 122 are used to emphasize that a component is stationary for illustrative clarity, but not all stationary components have hash mark in the figures.

FIGS. 2A and 2B show possible generic spring force 200 and spring energy profiles 252 which are generally indicative of the relationship between the valve displacement and the spring restoring force such as that shown in FIG. 1. During operation of the valve 100 of FIG. 1, the upper electromagnet 108 holds the armature 112 in an upper position with the valve 100 closed while a relatively large spring force is pulling the valve 100 downward. To open the valve 100, the upper electromagnet is turned off and the valve 100 is released. The combined mass/spring system of valve 100, valve stem 114, armature 112 and springs 104 and 106 begins a nearly sinusoidal oscillation. Following a half-cycle of motion, the lower electromagnet is activated and latches the valve in the open position. Since the spring force is large in the open position, the acceleration of the valve 100 is largest just as it latched. A similar sequence closes the valve 100. The electromagnets 108 and 110 together with the armature 112 therefore form a kind of linear motor.

Because the electronic engine valve of FIG. 1 has maximum spring forces when the electromagnets 108 and 110 latch the valve 100 open or closed, the valve 100 undergoes an impulse in its $3^{rd}$ derivative of motion known as the "jerk." This impulse is associated with vibration and noise even when the valve 100 is latched at zero velocity. In practice, the latching forces can cause the armature 112 to impact the electromagnets 108 and 110 causing additional noise and vibration. Moreover, the valve 100 must contact the valve seat 116 at nearly the same time that the armature 112 contacts the upper electromagnet 108. Otherwise the valve 100 may leak or may impact the valve seat 116 with excessive velocity. This creates a tolerance problem that increases the cost of manufacturing and complicates the control of the electronic engine valve. The problem of positioning the valve seat 116 accurately relative to other components (e.g., the face of upper electromagnet 108) is common and the present discussion refers to it as the "valve seat positioning problem" when it occurs.

The generalized solid curve 252 in FIG. 2B can be seen to specifically illustrate the total spring potential energy in the springs 104 and 106 of FIG. 1. In the middle position, the potential energy is defined to be zero, and as the armature 112 is deflected in either direction from this middle position the spring potential energy grows in a characteristic quadratic form of curve 252 for ideal springs obeying Hooke's law. The motion of the valve 100 under the forces of the springs 104 and 106 is analogous to the motion of ball 250 rolling in the energy well defined by the total potential energy curve 252 of the springs 104 and 106. As may be clearly understood from FIG. 2B by one of ordinary skill in the art, the intersection of the axis labeled spring potential energy, the axis labeled displacement, and the curve 252 represents a state in which the valve 100 tends to return after being disturbed and which point is commonly understood as stable equilibrium. Accordingly, the middle position 212 at the bottom of the potential energy well is a stable equilibrium point. The fact that the ball 250 is on a steep incline as shown is consistent with the large restoring force being applied to the valve 100 in the open position. The large restoring force of the spring 104 and 106 implies that the linear motor (i.e., electromagnets 108 and 110 together with the armature 112) must apply large holding forces to maintain the valve 100 in the open or closed position which is often undesirable as this requires electrical power.

In light of the above, a more desirable ideal shape for a potential energy function is that shown by the dashed curve 254 in FIG. 2B and corresponding ideal nonlinear restoring force curve 202 in FIG. 2A. Potential energy curve 254 reaches a peak at the open and closed positions corresponding to zero force in FIG. 2A where correspondences are indicated with dashed lines 206. If such an ideal nonlinear spring were created, the holding forces of the linear motor of FIG. 1 would be minimal and the associated jerk in the valve motion would also be minimized. In order to operate a valve with total spring potential energy of the ideal form shown as 254, such a linear motor would have to apply a small push to move the valve off the peaks of potential energy during valve transitions.

It is also known that the ideal nonlinear restoring force curve 202 in FIG. 2A can be, for example, accomplished with a cam and spring. The present discussion refers to any mechanism where the magnitude of the force or torque required to hold the valve open or closed is less than a peak spring force as a "nonlinear spring." Nonlinear springs are usually designed using cams in combination with springs generally abiding by Hooke's law. The ideal nonlinear restoring force curve 202 has a peak value which occurs at 204 and there is an intersection 210 where the curves 204 and 202 cross the displacement axis (with positive slope) and a corresponding zero total spring restoring force at the crossing point. Such intersection 210 is the point at which the valve 100 tends to return after being disturbed and which point is commonly understood as stable equilibrium. Accordingly, the intersection 210 is a stable equilibrium point. Whether the spring characteristic is linear or nonlinear, it is readily apparent that the given linear motor must supply any energy lost to friction, impacts, and vibration.

One example of a nonlinear spring can be realized with the prior art system of FIG. 3A. Cam 300 works in conjunction with cam followers 302 and 304, and two springs 306 and 308 to create the potential energy characteristic of FIG. 3B which has an associated nonlinear spring curve (not shown) similar to 202. Note that the ordinate in FIG. 3B is the motor displacement angle θ. The motor 310 is coupled to the cam 300 in any known manner (e.g., by gears, belts, or direct co-axial drive) as generally indicated by the dashed line 312. The motor executes a reciprocating motion and causes a reciprocating rotary motion of +/−45° in the cam relative to the θ=0° reference angle 314. The cam 300 is shown in the +45° position. An important property of this design is the fact that a positive follower force is applied consistently to the cam 300 during operation as the springs 306 and 308 are always under some level of compression. The present disclosure refers to such a follower and cam combination a "lashless cam." In contrast, a follower and cam combination whose contact force becomes less than or equal to zero at some point during its operation is called a "lashing cam." Lashing cams have the undesirable property of having impact between the follower and the cam which cause wear, vibration and energy loss.

It should be noted that the positive contact force in FIG. 3A is applied intrinsically by the energy storing springs 306 and 308 rather than extrinsically with a separate preload mechanism whose primary function is to apply force or absorb lash in the system. The present disclosure refers to any follower and cam combination held in positive contact using an energy storage spring as an "intrinsic lashless cam." Such cam and follower combinations are desirable due to their simplicity in addition to the reduction in impact, vibration, and noise associated with the elimination of lash in the valve system.

FIG. 3B shows the curve 350 for the total potential energy in the springs 306 and 308 for the system of FIG. 3A. The symmetry of the curve follows from the symmetry of the cam 300, followers 302 and 304, and identical maximum compression and spring constants of the springs 306 and 308. All of these factors can be varied to shape the total potential energy curve. For example, one prior art design aims to minimize the peak energy 352 in order to minimize the torque supplied by the motor. Further, the 90° angle shown between the springs 306 and 308 can be varied to shape the total potential energy curve. In addition to the compressive force that the cam 300 applies to the followers 302 and 304 and springs 306 and 308, the cam 300, at some points in the cycle, also disadvantageously applies a tangential force to the followers 302 and 304 and a bending force the valve stem 315 and pin 316, induces bending vibrations in the valve stem 315 and pin 316, and increases frictional forces in the valve guide 318 and pin guide 320. Because the valve guide 318 often serves as a gas seal, it is difficult to mitigate frictional losses with rolling element bearings or other such mechanisms in the valve guide 318. In the present disclosure, this type of cam follower producing tangential or bending forces is described as a "non-zero tangential force cam" and those that do not produce tangential or bending forces are described as a "zero tangential force cam." It should be understood though that exactly zero tangential force is not attainable due to manufacturing and other imperfections.

FIGS. 4A, 4B, and 4C depict another prior art electronic valve system. FIG. 4B is a section of the disk cam 400 in FIG. 4A along section 4B-4B. FIG. 4C shows the total potential energy function 460 for springs 402 as a function of motor angle θ in FIG. 4A.

FIG. 4A shows the half-open position for valve 404 corresponding to the minimum total potential energy of the springs 402. Motor 406 drives the disk cam 400 in a rotary oscillatory fashion. FIG. 4B shows section 4B-4B of FIG. 4A. The cam follower 408, typically a roller follower, follows the cam slot profile 430 during valve transitions. The cam slot profile surface is nearly tangent to a concentric circle at 432 in the valve open position, and nearly tangent to a second concentric circle at 434. The axis of cam rotation in FIG. 4B corresponds to the center of the concentric circles 432, 434. This near tangency condition at 432 and 434 implies that the motor torque required to hold the valve closed or fully open is advantageously nearly zero. The flats 462 and 464 in FIG. 4C correspond to the mentioned tangencies in the cam profile.

With further regard to FIG. 4A, as one of the equilibrium positions of the springs 402 is the half-open position, the follower 408 applies an upward force along the positive Z direction (shown by arrow at bottom of FIG. 4A) when the valve 404 is closed and a downward force along the negative Z direction when the valve 404 is fully open. As a consequence, the cam 400 and follower 408 combination is a lashing cam. The follower must alternately contact the inner and outer profile surfaces of the cam slot 430. This lash disadvantageously causes impact, vibration, and energy losses in the valve system. In addition, the force 436 applied to the follower 408 by the cam 400 has a non-zero tangential component 415. Thus, such cam system is a non-zero tangential force cam. Accordingly, it applies a bending force to the valve stem 410 thereby creating bending vibrations of the valve stem 410, and contributes to friction in the valve guides 411.

Another drawback of this design is the valve seat positioning problem associated with maintaining tolerance on dimension 412 between the seat and the cam profile surface at 434.

FIGS. 5A, 5B, and 5C show another known variation of that shown in FIG. 4A which can overcome the valve seat positioning problem because the cam profile is parallel to the valve motion in the seated position. FIG. 5B shows section 4B-4B of FIG. 5A. Rotary spring 500 together with disk cam 502 and cam follower 504 create the spring potential energy curve 558 shown in FIG. 5C. Note that the ordinate in FIG. 5C is the vertical displacement Z of the valve and linear motor 506. The minimum of curve 558 corresponds to the valve half-open position. The cam profile 530 is tangent to radial lines 532 and 534 at the ends of the motion so that the spring potential energy has flats 560 and 562 respectively. Consequently, the motor force opposing the spring force when the valve is closed or fully open is nearly zero. The linear motor must counter any gas forces on the valve in contrast to the design of FIG. 4A. Near the ends of the valve motion, the spring displacement forces are high. Hence, there is a large cam follower force 536 shown in FIG. 5B and a large tangential force 538. Thus, this prior art design provides a non-zero tangential force follower with the associated problems of bending forces and vibration and increased friction in the guides 508. Finally, this is a lashing cam system as the cam torque switches sign at the half-open point. Thus, there is impact, vibration, and energy loss as the cam follower moves from one surface of the cam slot to the other.

Thus, it is desirable to create a mechanical valve mechanism with a natural motion that is nearly the desired opening/closing motion of the valve and to augment this mechanism with an electric motor to control timing and compensate for losses due to friction, impacts, mechanism lash, vibration and other loss occurrences. It is desired, in addition, to have such an electrically actuated valve mechanism that has minimal friction, minimal bending forces on the valve stem, minimal jerk in the valve motion, minimal unwanted vibration, and minimal impacts to due to lash in the mechanism. It is also desired that the valve mechanism have minimal mass because the motor is needed to initiate the opening/closing of the valve and to stabilize the valve motion upon closing. Finally, it is desirable to have motor current waveforms that achieve the desired opening and closing times of the valve and also minimize the electrical power consumed by the electric motor.

SUMMARY OF THE INVENTION

It is an object of the present invention to obviate or mitigate at least one disadvantage of previous electrically actuated valve mechanisms.

In a first aspect, the present invention provides an electromagnetic valve apparatus, the assembly including: a valve stem having a longitudinal axis, the valve stem including a valve located on an end thereof; a motor providing displacement of the valve stem; a spring mechanism symmetrically providing force for translation to the valve, the spring mechanism being pivotably attached to a stationary section, the force providing positive contact pressure to the valve stem between a fully open position of the valve and a fully closed position of the valve; a first reduced force point corresponding to the fully open position and at which the force acts upon the valve stem to maintain the fully open position; and a second reduced force point corresponding to the closed position and at which the force acts upon the valve stem to maintain the fully closed position.

In further aspect, the present invention provides an electromagnetic valve apparatus, the assembly including: a valve stem having a longitudinal axis, the valve stem including a valve located on an end thereof; a motor providing displacement of the valve stem; a pivoting spring type nonlinear spring; a first reduced force point corresponding to the fully open position and at which the force acts upon the valve stem to maintain the fully open position; and a second reduced force point corresponding to the closed position and at which the force acts upon the valve stem to maintain the fully closed position.

According to the present invention there is a translational camshaft (i.e., cam) attached to a valve and a spring biased follower tracking the cam profile. Such a valve/cam/spring system creates a vertical force component along the axis of the valve stem such that the valve naturally opens subsequent to a small initial input force from a linear motor that pushes, or otherwise releases, the valve from the initial position. Once the motion is initiated, the natural motion of the valve/cam/spring system is such that the valve accelerates in the opening direction as potential energy in the spring is converted to kinetic energy of the valve. Then, as the valve approaches the open position, the valve decelerates, loses kinetic energy which is converted to potential energy in the spring by the cam profile. The linear motor applies relatively small forces to control the motion from the closed position, to compensate for losses due to friction, impacts, vibration, and other losses in the mechanism, and to control motion to the open position. The closing of the valve follows a similar sequence of events. For purposes of the present invention, this application refers to the operations of valve closing and valve opening as "valve transitions." There is substantial similarity in the opening and closing operations and, for brevity and illustrative clarity, it is therefore useful to introduce this notion of valve transitions.

Because external power is required for the motor to compensate for losses, it is important that losses due to friction, impacts between the cam and follower, and vibration throughout the mechanism be minimized. Accordingly, the valve/cam/spring system embodied in the inventive valve apparatus having a floating spring assembly is symmetric so that negligible lateral and bending forces are applied to the valve stem which would cause friction in the valve guides. Also, the cam follower contact is preloaded by the energy storing springs so that there are no losses due to lash impacts of the cam follower.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures.

FIGS. 4A, 4B, and 4C describe another prior art electromagnetic valve system.

FIGS. 5A, 5B, and 5C describe yet another prior art electromagnetic valve system.

FIGS. 12A and 12B describe yet another alternative embodiment of the present invention.

DETAILED DESCRIPTION

Generally, the present invention provides an apparatus for electronic engine valve operation that includes nonlinear springs and an electronically controlled actuator for driving valves in a manner which minimizes losses due to friction, impacts between the cam and follower, and vibration throughout the electronic engine valve. The present invention accomplishes this by providing an arrangement of the valve, cam, and spring that is symmetric so as to avoid lateral and bending forces typically otherwise applied to the valve stem and thereby avoid friction in the valve guides. The present invention also preloads the cam follower contact via the energy storing springs so as to preclude losses due to lash impacts of the cam follower.

Figures 6A, 6B:
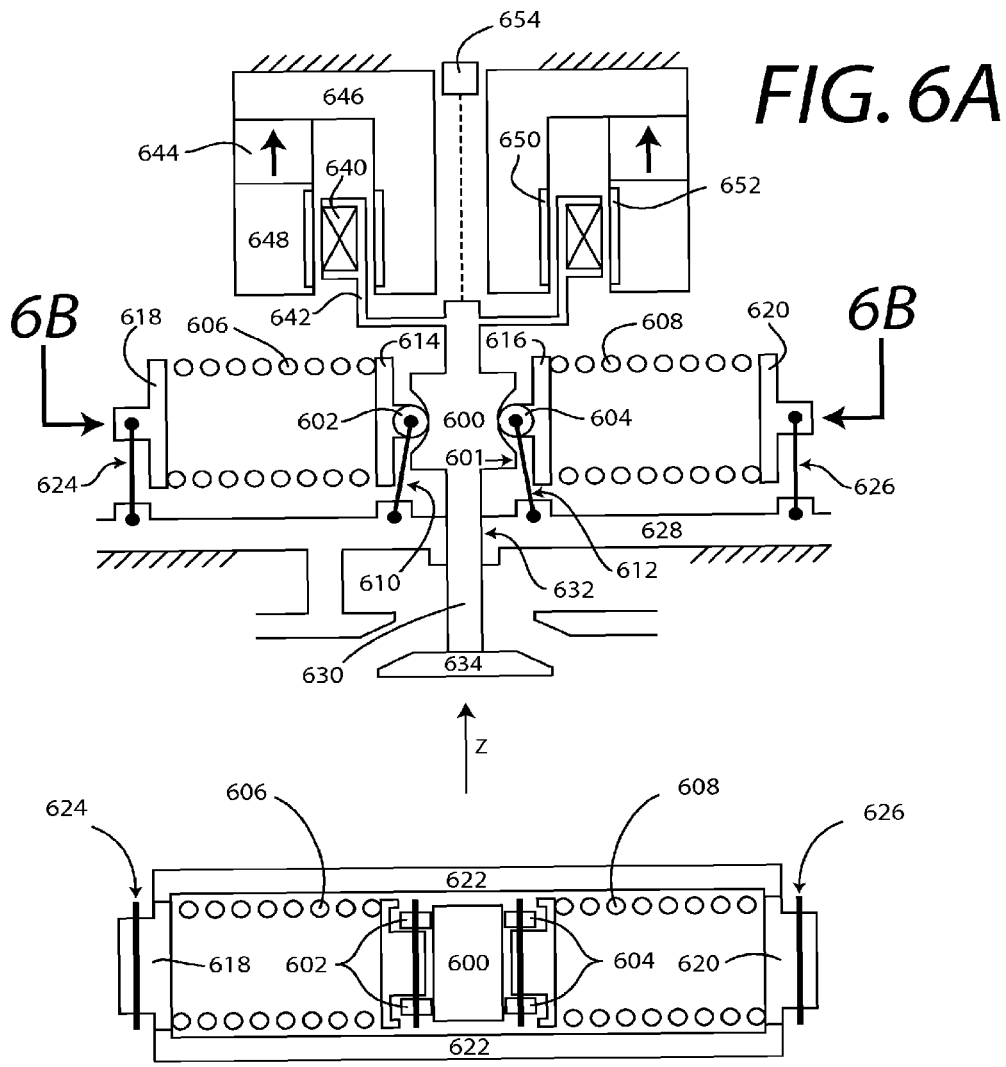
FIGS. 6A and 6B show the preferred embodiment of the present invention.

FIGS. 6A and 6B show a first embodiment of the present invention. This inventive arrangement overcomes problems in prior art designs regarding the valve seat positioning problem, lashing cam, non-zero tangential force, and incorporates an intrinsic lashless cam. The inertia of the moving masses is also minimized. Further, the inductance of the motor coil is minimized to enable the high-speed electronic control of the valve.

Figure 1:
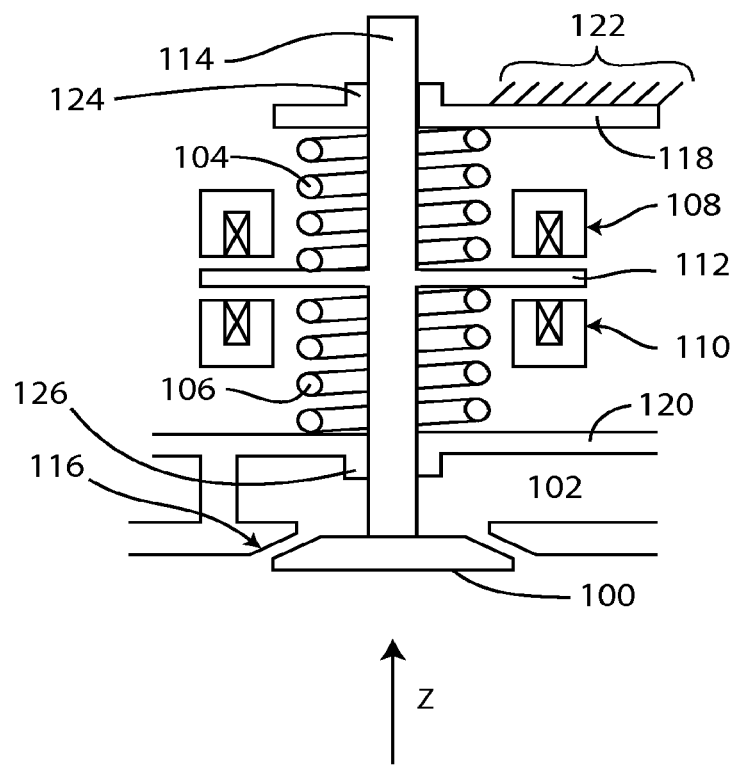
FIG. 1 shows a prior art electromagnetic valve system.
Figure 2A:
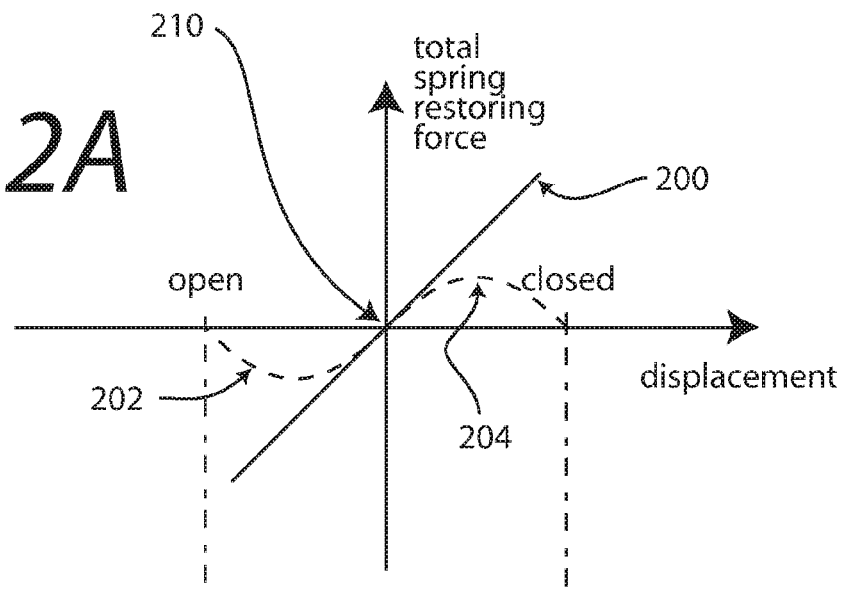
FIGS. 2A and 2B show possible generic spring force and spring energy profiles.

With specific reference to FIG. 6A, there is shown a symmetric translational cam 600 having a symmetric surface profile which produces an ideal nonlinear spring characteristic similar to that of curve 202 in FIG. 2A. FIG. 6B shows a section along 6B-6B in FIG. 6A. Roller followers 602 and 604 are pressed via expansion forces toward the lateral surfaces of cam 600 by springs 606 and 608 which are held under compression. The cam profile has four identical flats (one identified as flat 601). Each flat 601 provides for minimal holding force by the motor (described in more detail herein below) in the fully open and closed positions. Thus, the minimal holding force at each flat 601 may be alternatively described and identified as a reduced force point. Moreover, the cam flats 601 eliminate any valve seat position problem as previously described in the background section. It should be understood that the flats 601 may alternatively be only nearly flat and that various trade-offs on holding force and switching time of the valve 634 can be optimized in the cam profile design.

On the lower ends of the inner rocker arms 610 and 612, there are included stationary pivots retained in the engine head 628 and which position the roller followers 602 and 604 on the upper end of the inner rocker arms 610 and 612. Thus, the roller followers 602 and 604 are restricted to an arcuate motion which is largely horizontal for small lateral displacements. While there is some vertical motion of the roller followers 602 and 604, the combined cam, rocker, roller follower system is configurable to accomplish a desired force curve such as 202. For example, if a cam is first designed based on the assumption that the roller followers follow a purely horizontal motion, a modest reshaping of the cam will produce the desired force curve in the presence of arcuate roller follower motion. Springs 606 and 608 are held in position with inner spring retainers 614 and 616, and outer spring retainers 618 and 620. The outer spring retainers provide a compressive load on the springs and roller via cross members 622 located behind and in front of the springs as shown in FIG. 6B. The cross members 622 preferably consist of rigid bars that serve to maintain the orientation of spring retainers 614, 616, 618 and 620 in addition to providing the compressive load on the springs. The outer spring retainers 618 and 620 are supported with outer rocker arms 624 and 626 so that negligible lateral load is transmitted to the engine head 628 by any of the rocker arms 610, 612, 624, or 626. Further, the length of the rocker arms 610, 612, 624, 626 may be increased to minimize any vertical motion in the roller followers 602 and 604 as necessary.

Springs 606 and 608 form a spring mechanism symmetrically providing force for translation to the valve 634. However, it should be readily apparent from FIG. 6A that the symmetry of the spring mechanism and the use of rockers 624 and 626 will accommodate any residual asymmetry due to an assortment of variables such as mechanical variations or manufacturing imperfections. Examples of such variables could be slight differences in stiffness between the two springs 606 and 608 or variations in their equilibrium length. It should therefore further be apparent that the use of rockers 624 and 626 are important components in that they provide the "floating" aspect for the spring mechanism due to the fact that the springs 606 and 608 are not rigidly attached to the engine head 628.

Figure 7A:
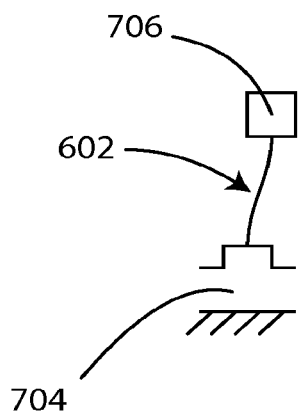
FIGS. 7A and 7B show flexure elements useful in the invention.
Figure 7B:
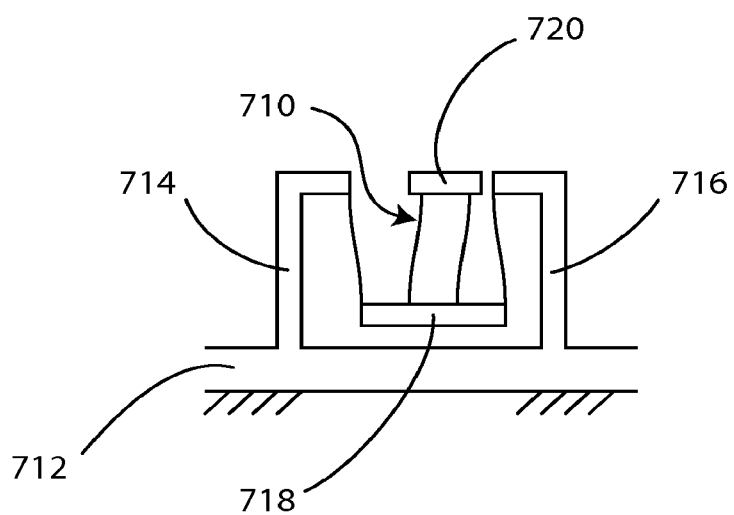

Still further, some or all of the rocker arms 610, 612, 624, 626 may be replaced with flexures to constrain the motion of the roller followers and the flexures may serve some or all of the spring function as well. FIG. 7A depicts a flexure 702 made from elastic material such as, but not limited to, spring steel or titanium, mount 704, and attachment 706 where spring retainers are attached rather than to rocker arms. The flexure in FIG. 7B is shown displaced to the right relative to the equilibrium configuration of the flexure which lies along a straight line segment. As the flexure bends, there is a small amount of vertical motion that can be accounted for in the design of the cam profile. FIG. 7B shows another type of flexure support system incorporating a folded-beam flexure. This flexure support system incorporates four flexures of the type indicated at 710. Mount 712 is connected by supports 714 and 716 to two flexures which, in turn, are connected via floating body 718 to two more flexures connecting to the attachment 720 where the spring retainers are attached.

In the inventive embodiment including either the rocker arms or folded-beam flexures, there is negligible lateral load transmitted to the valve stem 630 due to the rocker arms (or folded-beam flexures) and the symmetry of the double translational cam system. Thus, such an electronic valve system in accordance with the first embodiment has a zero tangential force cam in the sense that the only source of bending forces on the valve stem is parasitic frictional force in the rocker arms (or folded-beam flexures), minor imbalances in the spring masses, and similar second order effects. While the present description uses the term "spring" in the aforementioned and the following embodiments and illustrates such spring in particular as a coil spring, it should further be understood that any similar device that stores potential energy in the elastic deformation of a solid or gas may be used. For example a wave spring, torsion spring, leaf spring, cantilevered elastic beam, elastic flexures, or gas springs are within the scope of the intended invention so long as there is a positive contact force between the followers and the symmetric translational cam. This positive contact ensures lateral forces from the spring for continuous contact pressure between the cam and follower(s).

With continued reference to FIG. 6A, the outer rocker arms 624 and 626 allow the cross members 622 and outer spring retainers 618 and 620 to move to a minimum spring energy position so that there is no net tangential bending force on the valve stem 630 and valve guide 632. Because of the effect of the outer rocker arms 624 and 626, the present invention is described as an electronic valve apparatus which has, as previously mentioned above, a "floating" spring assembly that applies negligible net bending force on the valve stem 630. The floating spring assembly is itself formed by at least a spring mechanism having one or more springs where such springs may be of varying type. Indeed, the springs may vary independently from one another in structure and design so long as the spring mechanism collectively provides negligible net bending force of the valve stem 630 thereby enabling the floating spring assembly to function as intended. It should further be understood that the outer rocker arms 624 and 626 and cross members 622 can be replaced with two rigid supports for the outer spring retainers without affecting the symmetry of the spring and cam system and without straying from the intended scope of the present invention. Moreover, the floating spring assembly can minimize bending forces on the valve stem even when there are differences in stiffness between the two springs 606 and 608 due to manufacturing errors. Still further, the floating spring assembly is arranged in such a manner that precludes unfettered movement due in large part to the tethering aspect of the rocker arms which also form part of the floating spring assembly. Such tethering provides smooth action of the floating spring assembly and avoids random and clumsy motions such as would occur via typical guides.

Referring again to FIG. 6A, the linear motor will now be further described. Such motor is shown in the form of a generally axisymmetric moving coil actuator (frequently called a voice-coil actuator in the linear motion case) which is used to actuate the valve stem 630 and hence the valve 634. The voice coil actuator includes a wire coil 640 wound on bobbin 642. A radial magnetic field is provided for the conductive wire coil 640 using annular magnet 644, iron core 646, and iron pole 648. The iron core 646 and iron pole 648 incorporate, respectively, inner conductive shields 650 and outer conductive shields 652. Eddy-currents induced in the conductive shields 650 and 652 by time-varying currents supplied to the conductive wire coil 640 serve to confine time-varying magnetic fields produced by the coil 640. Hence, the inductance, and more generally the impedance, of the coil 640 is reduced in magnitude so that high currents in the coil 640 can be changed more quickly and with lower control voltages. The conductive shields 650 and 652 are typically made from copper or aluminum, and their dimensions are optimized to balance the positive effects of shielding and the negative effects of reduced flux through the coil 640 due to their low magnetic permeability. The conductive shields 650 and 652 can also be made from alternating layers of thin copper and iron rings stacked vertically to provide shielding and high average magnetic permeability. Other approaches readily apparent to one of skill in electrical motor design related to mixing conductive and permeable materials and alternative embodiments of a linear motor are possible as well without straying from the intended scope of the present invention.

In FIG. 6A, there is also shown sensor 654 which is in communication with valve stem 630. The sensor 654 monitors movement characteristics such as the position, velocity, and/or acceleration of the valve stem 630 for feedback control of the voice coil actuator or other embodiments of a linear motor. The sensor 654 may be inductive, capacitive, optical or any other form of sensor mechanism so long as it provides the requisite measurement for control. One cost-effective form of sensing is to use the back electromotive force (or "back-EMF") voltage generated by the motion of the coil to estimate its position. Similar approaches have been applied to so-called "sensorless" motor control and the present disclosure uses such terminology in the same way herein. The method of estimating the position may employ what is known as an "observer" to those skilled in the art of control engineering.

Referring to FIG. 6B which is a cross-sectional view taken from line 6B-6B in FIG. 6A, it should be readily understood that there are a total of four roller followers 602, 604 in this embodiment, though there need only be at least two followers. One advantage of the configuration as shown and described is that this arrangement serves to prevent rotation of the valve 634 which protects the power supplying flexible wiring or flat cable (not shown) that connects to the conductive wire coil 640.

Figure 2B:
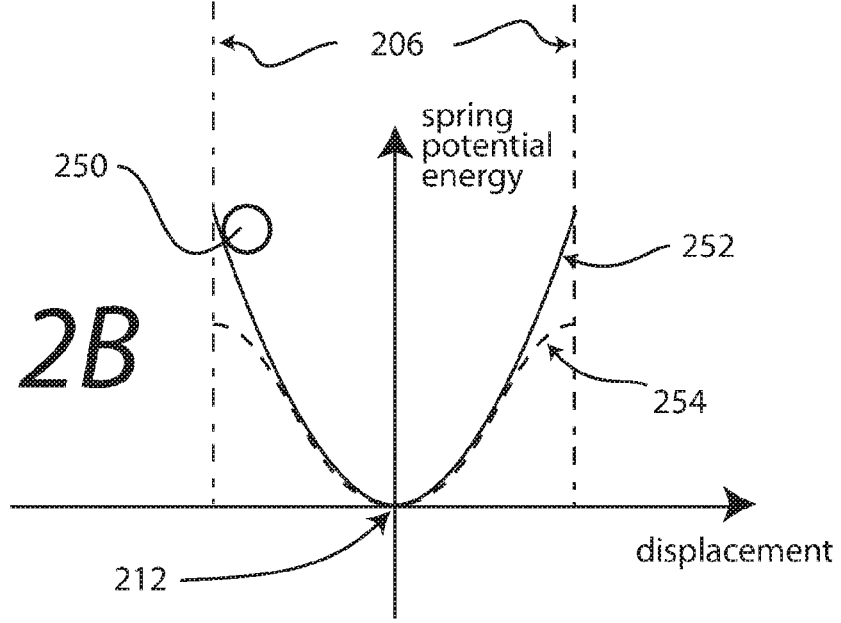
Figures 3A, 3B:
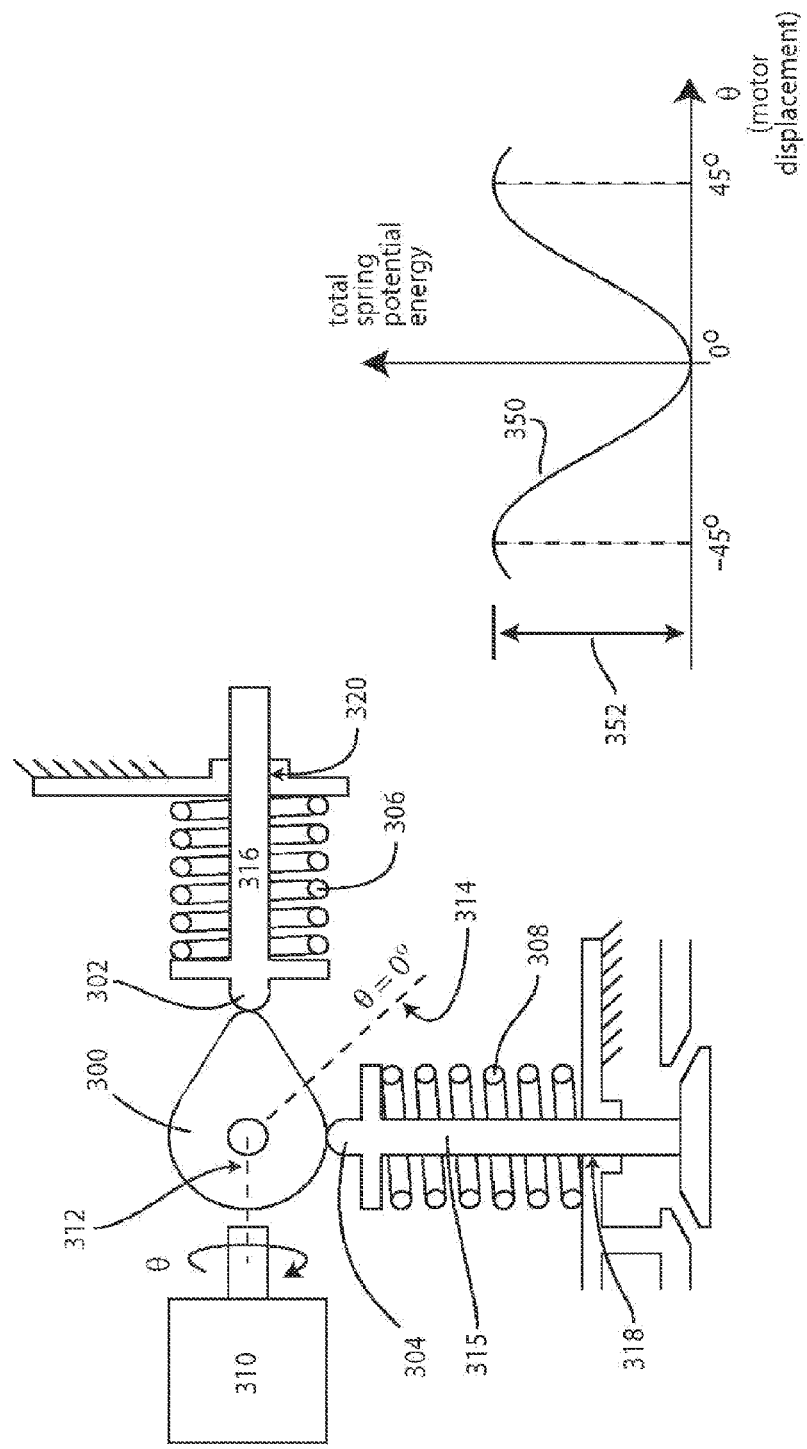
FIGS. 3A and 3B describe one prior art electromagnetic valve system.
Figure 8:
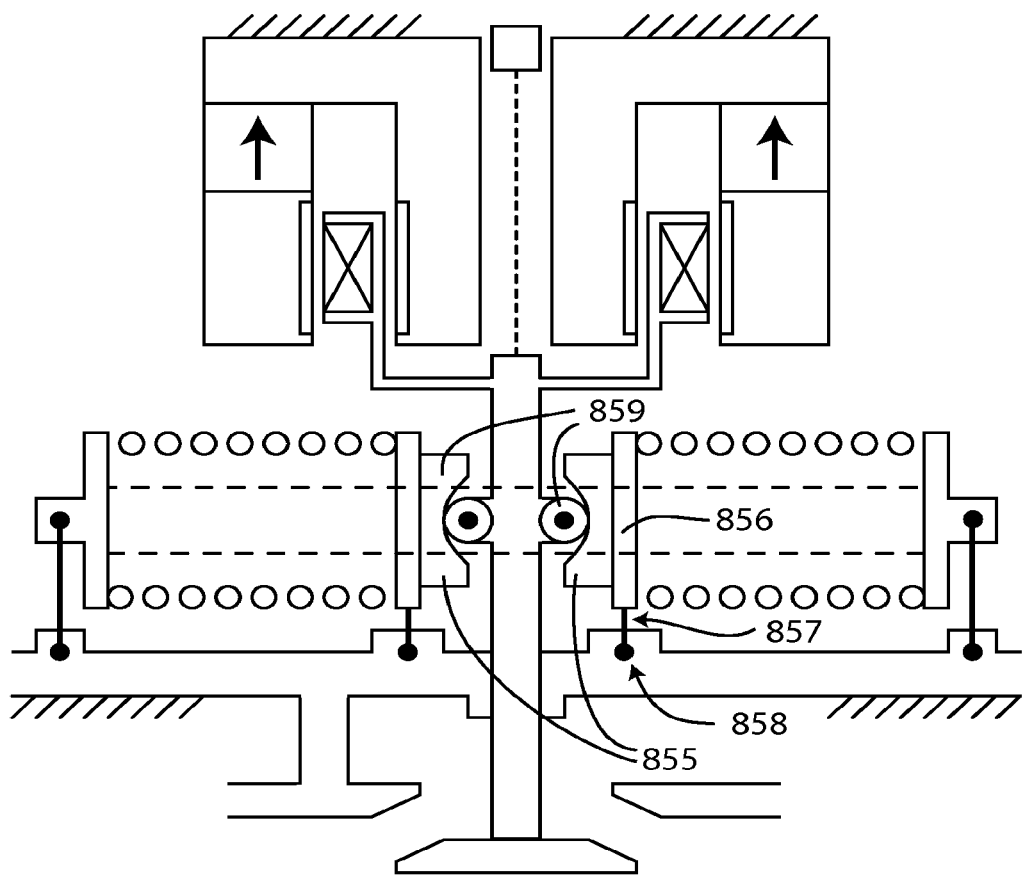
FIG. 8 shows another alternative embodiment of the present invention.

FIG. 8 depicts a further embodiment of the present invention. In this embodiment, the positions of cams 855 and followers 859 are interchanged relative to the previous embodiment. Here, the resulting nonlinear spring energy has the same preferred ideal curve 254 as shown in FIG. 2B. Another difference in this embodiment is that the cams 855 are rigidly attached to spring retainer 856 versus rigid attachment to the valve stem. The spring retainer 856 is rigidly attached to rocker arms 857 which are attached to pivot 858. Followers 859 are attached to the valve stem. As in the previous embodiment, this alternative embodiment is symmetric and functions in a similar manner as before.

Figure 9:
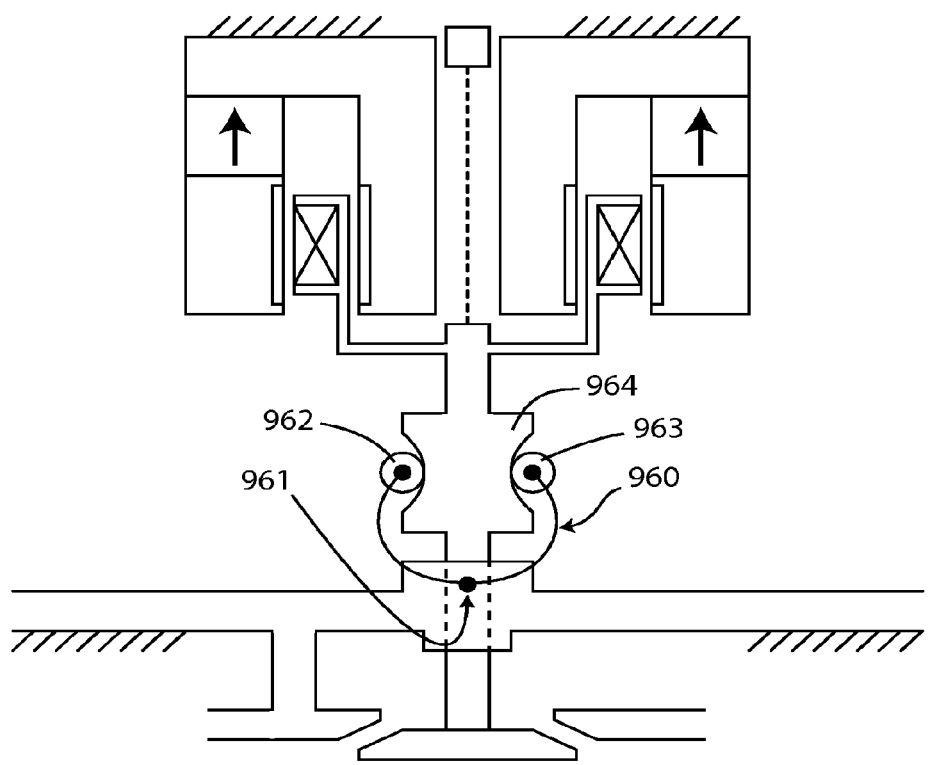
FIG. 9 shows yet another alternative embodiment of the present invention.

FIG. 9 is yet another embodiment of the present invention with a cam design identical the first embodiment shown in FIG. 6A. While the linear motor, cam, and valve components remain unchanged from the first embodiment, the floating spring assembly in the form as shown and described in the preceding embodiments has been replaced with flexible element 960. The flexible element 660 is itself a spring movably affixed at a centrally located pivot. Here, the symmetrical spring energy is stored in flexible element 960 provides generally equal lateral compression of the followers 962 and 963 against the cam 964 so as to provide positive contact pressure on the cam. Thus, an effective floating spring assembly is accomplished by supporting the flexible element 960 on the pivot 961.

Figure 10A:
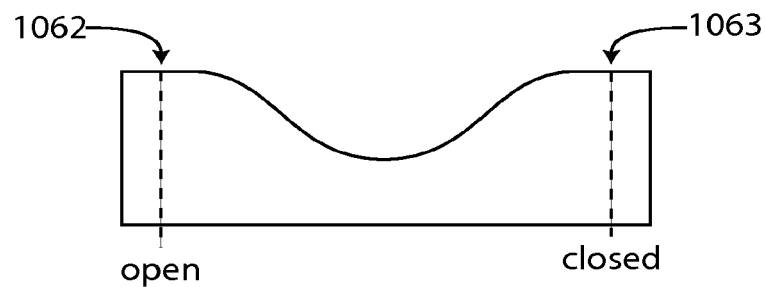
FIGS. 10A and 10B show cam profiles.

FIG. 10A is the cam profile for the first embodiment as seen in FIG. 6A which produces potential energy plateaus at 1062 and 1063. With such potential energy plateaus at 1062 and 1063, the linear motor can hold the valve in the open and closed position with little or no effort to counter the nonlinear spring forces. Further, the potential energy plateau at 1063 near the closed position eliminates any valve seat positioning problem because a feedback control system can, through sensing provided by sensor 654, learn the valve seat position and control the closing velocity in response to physical variables including, but not limited to, manufacturing errors, thermal expansion, and wear.

Figure 10B:
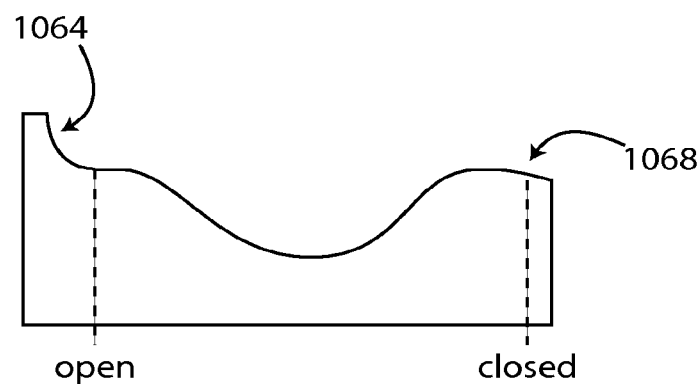

FIG. 10B illustrates possible cam profile modifications that accomplish certain beneficial functions. For example, an opening variation 1064 may indicate a corresponding mechanical stop feature which will limit the motion of the valve near the open position, and a profile closing variation 1068 may indicate a different physical cam feature configured to create a small closing force on the valve when the linear motor is not energized. Note that the closed position can vary somewhat and the profile closing variation 1068 will still provide a small closing force.

Figure 11A:
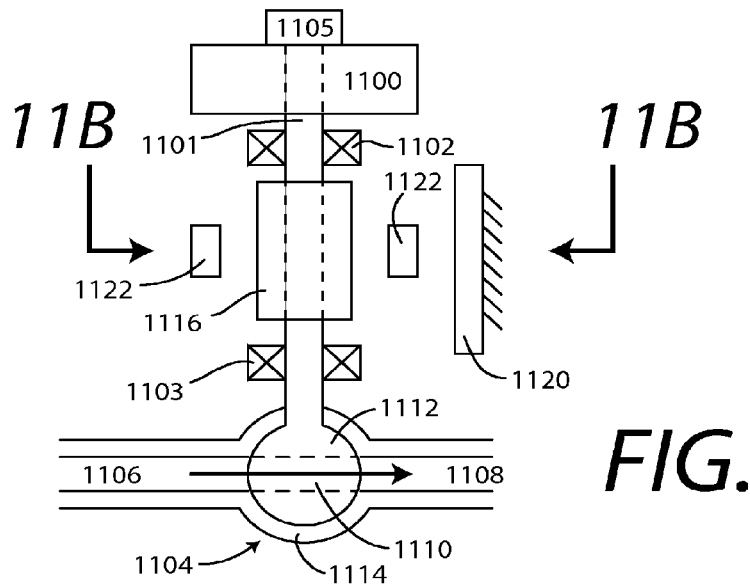
FIGS. 11A and 11B show a rotary embodiment of the present invention.
Figure 11B:
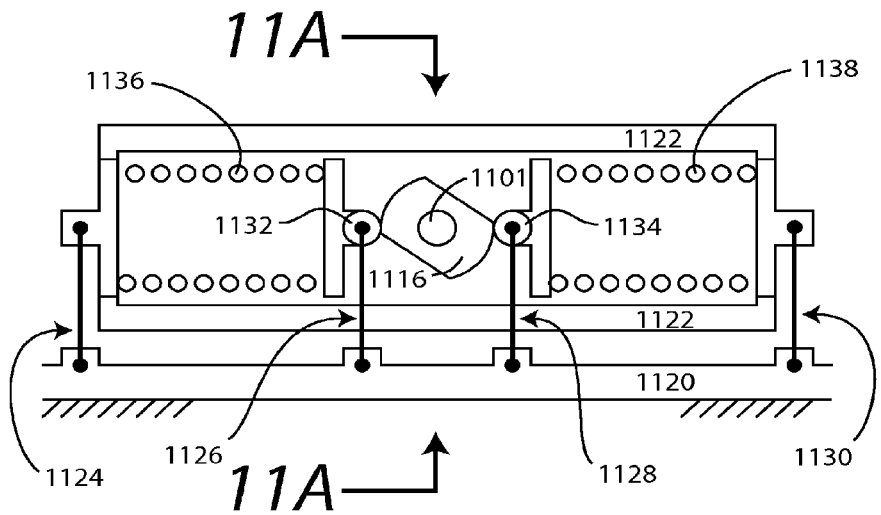

The aforementioned embodiments and cam configurations are equally applicable to rotary cam implementations. As such, FIGS. 11A and 11B illustrate one possible rotational embodiment of the present invention. This rotational embodiment is analogous to the embodiment of FIGS. 6A and 6B with the linear motor replaced with a rotary motor, the symmetric translational cam replaced with a symmetric rotary cam, and the linear poppet valve replaced with a rotary ball valve. Accordingly, most of the components in FIGS. 11A and 11B can be understood in terms of the detailed description of FIGS. 6A and 6B with explanations as noted herein below.

With reference to FIG. 11A, a rotary motor 1100 rotates valve stem 1101 supported by bearings 1102 and 1103. The valve stem 1101 is connected to a rotary ball valve 1104 whereby rotation is monitored with sensor 1105 mounted on the valve stem 1101. The rotary ball valve 1104 consists of an input port 1106, an output port 1108, and a flow passage 1110 in the ball 1112. As should be readily apparent, when the flow passage 1110 in the ball 1112 is aligned with ports 1106 and 1108, the valve is therefore open as shown and non-alignment occurs during valve closure. The ball valve housing 1114 may incorporate fluid or gas seals (not shown) as is customary in the art. To enable rapid switching between the fully open and fully closed positions of the valve—roughly 90° rotation—a nonlinear spring operates with regard to a cam 1116 attached to the valve stem 1101. The nonlinear spring is described with reference to FIG. 11B below along with other components.

FIG. 11B is a cross section representing a plane 11B-11B as indicated in FIG. 11A. Here, there are illustrated the cam profile of rotary cam 1116, cross members 1122, support 1120, rockers 724, 726, 728, 730 and roller followers 732, 734, and springs 736 and 738. The section 11A-11A of FIG. 11B is that section depicted in FIG. 11A. For the cam angle shown, the springs are in their most compressed state. By rotating the cam in the clockwise direction from the open position, spring potential energy is transformed into rotary kinetic energy and then back into spring potential energy as the valve moves to the closed position. Negligible lateral loads from the springs are translated to the valve stem due to the symmetry of the system and the use of a floating spring assembly accomplished with the rocker arms shown.

FIG. 12A shows yet another embodiment of the present invention wherein the nonlinear spring is formed of upper springs 1202, lower springs 1204, and eight pivots 1206. A linear motor 1200 is provided in a similar manner to the linear motor components described in regard to FIG. 6A. Each pivot 1206 is located at the end of each spring 1202 and 1204. Four pivots are relatively stationary in that they are located in a fixed manner on a mounting structure 1207 and four pivots are movable in that they are located on the reciprocating valve stem 1208. In the configuration shown, lower springs 1204 are at their natural length and apply no force to the pivots 1206 to which they are attached. Upper springs 1202 are compressed, but apply no net force to the valve stem so that the valve is in an equilibrium position relative to the potential energy in the springs 1202 and 1204. For purposes of this description, this nonlinear spring configuration is referred to as a pivoting spring type nonlinear spring. As the valve is opened by linear motor 1200, the upper springs release their potential energy and help accelerate the valve toward the open position shown in FIG. 12B. In this movement, the kinetic energy of motion is converted back to potential energy in the springs. Accordingly, the springs and pivots create a desirable ideal nonlinear spring energy curve similar to 254 in FIG. 2B.

Figures 12C, 12D:
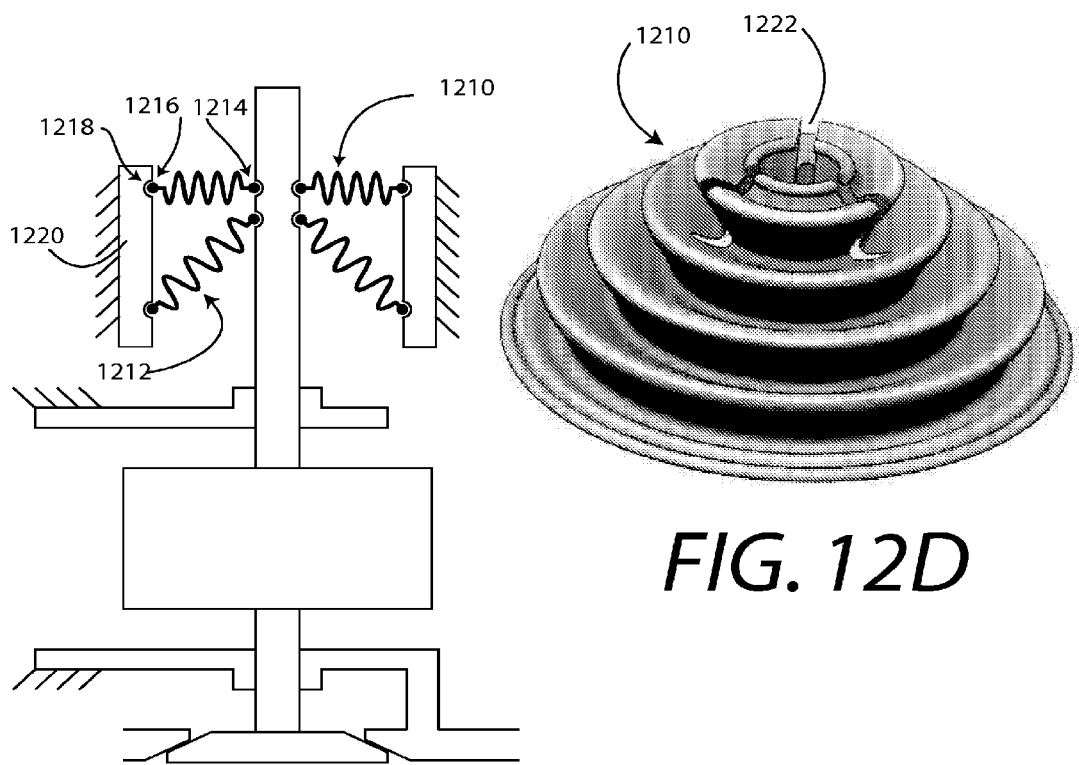
FIGS. 12C and 12D describe yet still another alternative embodiment of the present invention.

FIG. 12C shows a variation on the alternative embodiment of FIGS. 12A and 12B. In this embodiment, the upper spring 1210 and lower spring 1212 are formed by disk springs. For purposes of illustrative clarity, such a disk spring is show in isometric FIG. 12D. The disk springs 1210 have rolled edges 1214 and 1216 which form bearing surfaces and fit in grooves such as 1218 in cylindrical housing 1220 and similar grooves in the valve stem. The grooves 1218 serve to function as pivot points. The natural uncompressed form of disk spring 1212 is that form depicted in FIG. 12C where the disk spring 1212 has a conical form pointed upward. The natural uncompressed form of disk spring 1210 is a similar conical form pointed downward. It should be understood therefore that either disk spring in its compressed form represents an unstable equilibrium position. Slots 1222 shown in FIG. 12D facilitate the construction of the electronic valve system in that the disk spring can be pressed onto the valve stem and the rolled edges such as 1214 will snap into place thereby effectively forming pivot points on the valve stem.

Operation of the first embodiment as shown in FIG. 6A will now be described in terms of valve movement in relation to FIGS. 13A through 13D.

Figure 13A:
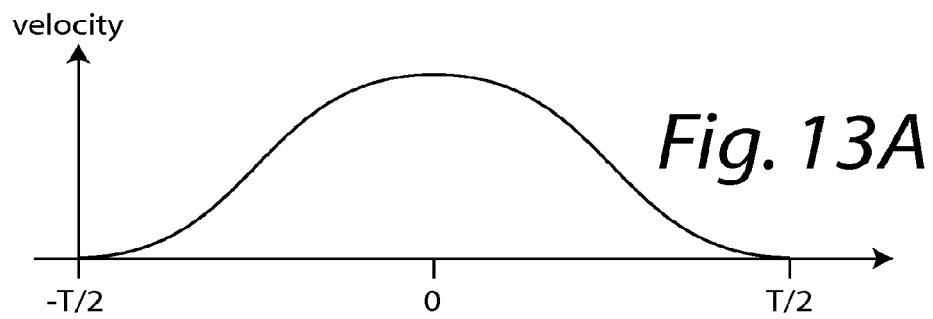
FIGS. 13A, 13B, 13C, and 13D describe preferred motor current profiles for the present invention.
Figure 13B:
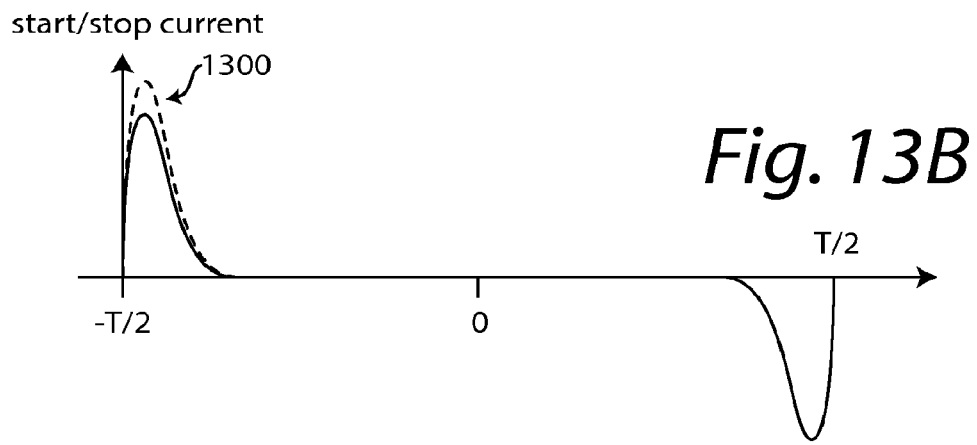
Figure 13C:
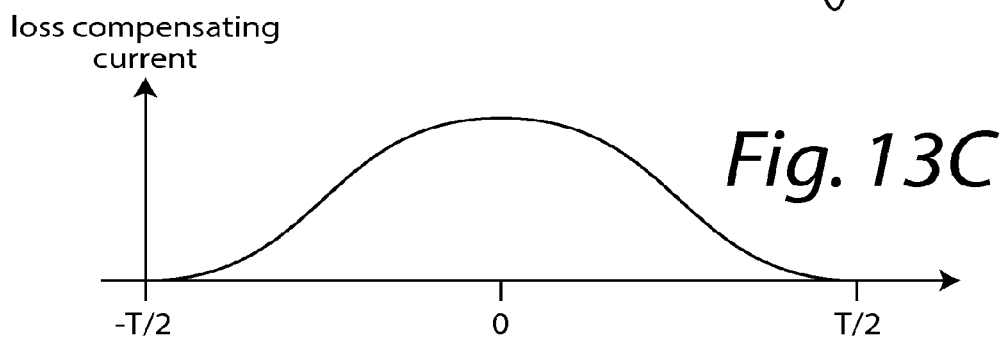
Figure 13D:
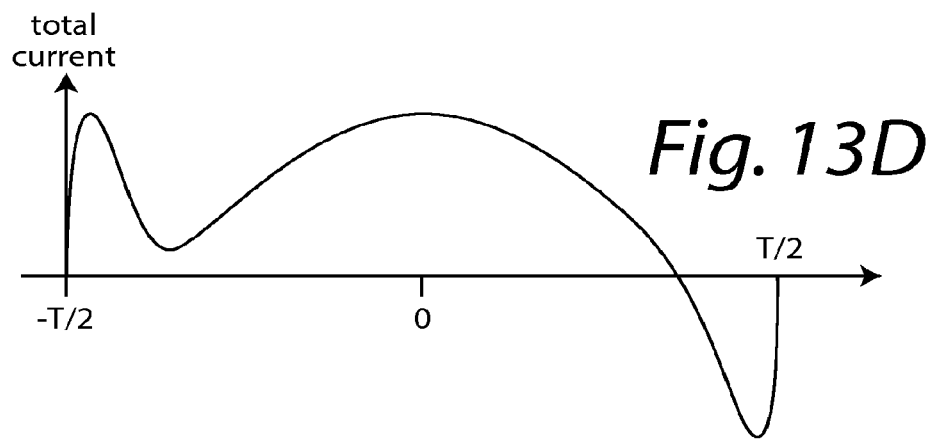

FIG. 13A graphically depicts a typical velocity waveform for the closing of the valve in FIG. 13A. The time interval for a transition T is taken to be [−T/2, T/2] so that the midpoint is 0. FIG. 13B graphically depicts a corresponding current waveform for the linear motor in FIG. 13A with an initial pulse to start the motion and a final pulse to stop the motion - with a significant fraction of the forcing coming from the nonlinear spring. The dashed curve 1300 depicts an enlarged initial pulse necessary to compensate for friction or other losses in the electromagnetic valve system. FIG. 13C shows an alternative and desired current signal shape that should be added to the solid curve of FIG. 13B to compensate for friction and other losses. FIG. 13D shows a typical current waveform which is the sum of start and stop pulses (FIG. 13B) and a compensation waveform (FIG. 13C) for friction and other losses. Mathematically, such energy transfer to the moving components as graphically depicted can be postulated as follows.

Consider the force produced by permanent magnet linear motors of the type shown in FIG. 6A can be approximated by $$F(t) = KI(t) \qquad (Eq. 1)$$

Where F(t) is the force in the positive Z direction (e.g., in Newtons), K is the force constant of the motor (e.g., in Newtons/Amp), and I is the coil current (e.g., in Amps). The power lost in the coil due to ohmic heating is $$P_{ohmic}(t) = I(t)^2 R \qquad (Eq. 2)$$

where R is the coil resistance. The mechanical power delivered to the valve stem is $$P_{mechanical}(t) = F(t)v(t) \qquad (Eq. 3)$$

Where F(t) where v(t) is the velocity of the valve. There are many formulations of the optimal control problem involving efficiency, voltage and current limits on the drive electronics and so forth, but a simple measure of performance that points to an aspect of the present invention is the maximization of mechanical energy to the ohmic loss in the coil. Preferably, for the sake of convenient normalization, the ratio of mechanical energy to the square root of the ohmic loss in the coil will be optimized:

$$\frac{\int_{-T/2}^{T/2} F(t)v(t)\,dt}{\sqrt{\int_{-T/2}^{T/2} I(t)^2 R\,dt}} = \frac{K}{\sqrt{R}} \frac{\int_{-T/2}^{T/2} I(t)v(t)\,dt}{\sqrt{\int_{-T/2}^{T/2} I(t)^2\,dt}} \qquad \text{(Eq. 4)}$$

Using the notions of norms and inner products in Hilbert spaces, the rightmost term in previous equation is a constant multiplied by an inner product divided by a norm. Assuming that the desired velocity waveform v(t) is fixed, the Cauchy-Schwarz inequality reveals that the optimal loss compensating current waveform is proportional to velocity:

$$I(t) \propto v(t) \qquad \text{(Eq. 5)}$$

Normally, the sign of the friction compensating current is such that it enhances the motion of the valve and the current and velocity have the same sign. However, in some cases gas forces on the valve may overcome friction and act to accelerate the valve transition. In this case, the desired compensating current will tend to slow the valve and will have the same shape as the velocity waveform but have opposite sign.

This heuristic derivation of the optimal compensating current can be validated with more detailed optimization calculations that incorporate the cam profile, friction models, coil inductance, current/voltage limits of the drive electronics. In spite of the simplicity of the formulation of equations (1-5), the utility of a loss compensating current of the form shown in FIG. 9C persists under a range of conditions. The start/stop current has a largely antisymmetric form with peaks at the ends of the switching time interval, and the loss compensating current has a largely symmetric form with a broad peak.

Near optimal waveforms like that of FIG. 9D can be characterized more quantitatively as follows. The symmetric part, $I_s(t)$, and antisymmetric part, $I_a(t)$, of the total current waveform, I(t), are given by $$I_s(t) = \frac{1}{2}(I(t) + I(-t)) \qquad \text{(Eq. 6)}$$

$$I_a(t) = \frac{1}{2}(I(t) - I(-t)) \qquad \text{(Eq. 7)}$$

Observe that $I(t)=I_s(t)+I_a(t)$. The antisymmetric part is largely the start/stop signal, and the symmetric part is largely the friction compensation signal. Define a normalized standard deviation for the symmetric part to quantify the spread of the compensating current as follows. The area under the absolute value of the symmetric part is given by $$\|I_s\|_1 = \int_{-T/2}^{T/2} |I_s(t)|\,dt. \qquad \text{(Eq. 8)}$$

Define a normalized symmetric current by $$I_{sn}(t) = \frac{|I_s(t)|}{\|I_s\|_1} \qquad \text{(Eq. 9)}$$

The area under this positive-valued function is 1 so that it is similar to a probability density function. Finally, define a normalized standard deviation of the symmetric part by $$\sigma_{sn} = \sqrt{\int_{-T/2}^{T/2} I_{sn}(t)\left(\frac{t}{T}\right)^2 dt} \qquad \text{(Eq. 10)}$$

It thus forms part of the present invention to use efficient current signals with broad symmetric parts located near the middle of the time interval. Such symmetric parts generally have either positive or negative sign, and have normalized standard deviations of less than ¼ and preferably near ⅕.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An electromechanical valve assembly, said assembly comprising:
   a valve stem having a longitudinal axis, said valve stem including a valve located on an end thereof;
   a motor providing displacement of said valve stem;
   a spring mechanism symmetrically providing force for translation to said valve, said spring mechanism being pivotably attached to a stationary section, said force providing positive contact pressure to said valve stem between a fully open position of said valve and a fully closed position of said valve;
   a first reduced force point corresponding to said fully open position and at which said force acts upon said valve stem to maintain said fully open position;
   a second reduced force point corresponding to said closed position and at which said force acts upon said valve stem to maintain said fully closed position; and
   a stable equilibrium point between said first and second reduced force points.

2. The assembly as claimed in claim 1, further including a translational cam located between said motor and said valve, at least two followers movably engaging said translational cam, and said force providing constant engagement of said translational cam and said followers with one another.

3. The assembly as claimed in claim 2, wherein said translational cam is located on said spring mechanism and said followers are located on said valve stem.

4. The assembly as claimed in claim 2, wherein said translational cam is located on said valve stem and said followers are located on said spring mechanism.

5. The assembly as claimed in claim 4, wherein said motor is a linear actuator providing said displacement along said longitudinal axis.

6. The assembly as claimed in claim 5, wherein said valve is a poppet valve.

7. The assembly as claimed in claim 4, wherein said motor is a rotary actuator providing said displacement about said longitudinal axis.

8. The assembly as claimed in claim 7, wherein said valve is a ball valve.

9. The assembly as claimed in claim 1, wherein said floating spring includes a first spring and a second spring, said first and second springs oriented opposite one another and each retained independently from one another by respective spring retainers, and said spring retainers each being pivotably attached to said stationary section by rocker arms.

10. The assembly as claimed in claim 9, wherein said first spring and said second spring are held in alignment by cross members.

11. The assembly as claimed in claim 1, wherein said spring mechanism includes a single spring pivotably attached at its center point to said stationary section.

12. The assembly as claimed in claim 11, further including a translational cam located between said motor and said valve, two followers each located at opposite ends of said single spring, said two followers movably engaging said translational cam, and said force providing constant engagement of said translational cam and said followers with one another.

13. The assembly as claimed in claim 1, further including a sensor in communication with said valve stem, said sensor monitoring movement characteristics for feedback control of said motor.

14. The assembly as claimed in claim 13 wherein said sensor is a coil having an inductance varying with positioning of said valve.

15. The assembly as claimed in claim 13 wherein said sensor is a capacitance sensor.

16. The assembly as claimed in claim 13 wherein said sensor is an optical sensor.

17. The assembly as claimed in claim 13, wherein said sensor, in conjunction with a current source of said motor, further establishes a loss compensating current for optimizing current supplied to said motor at said first reduced force point and said second reduced force point.

18. The assembly as claimed in claim 1 wherein said motor is a moving-coil type motor having conductive pole shields.

19. The assembly as claimed in claim 1 wherein said spring mechanism is pivotably attached at least in part with flexures.

20. An electromechanical valve assembly, said assembly comprising:
   a valve stem having a longitudinal axis, said valve stem including a valve located on an end thereof;
   a motor providing displacement of said valve stem;
   a pivoting spring type nonlinear spring;
   a first reduced force point corresponding to said fully open position and at which said force acts upon said valve stem to maintain said fully open position;
   a second reduced force point corresponding to said closed position and at which said force acts upon said valve stem to maintain said fully closed position; and
   a stable equilibrium point between said first and second reduced force points.

21. The electromagnetic valve assembly of claim 20 wherein said pivoting spring incorporates at least one disk spring.

* * * * *